July 3, 1956
J. J. FLOOD ET AL
2,753,425
WELDING MACHINE
Filed June 11, 1954
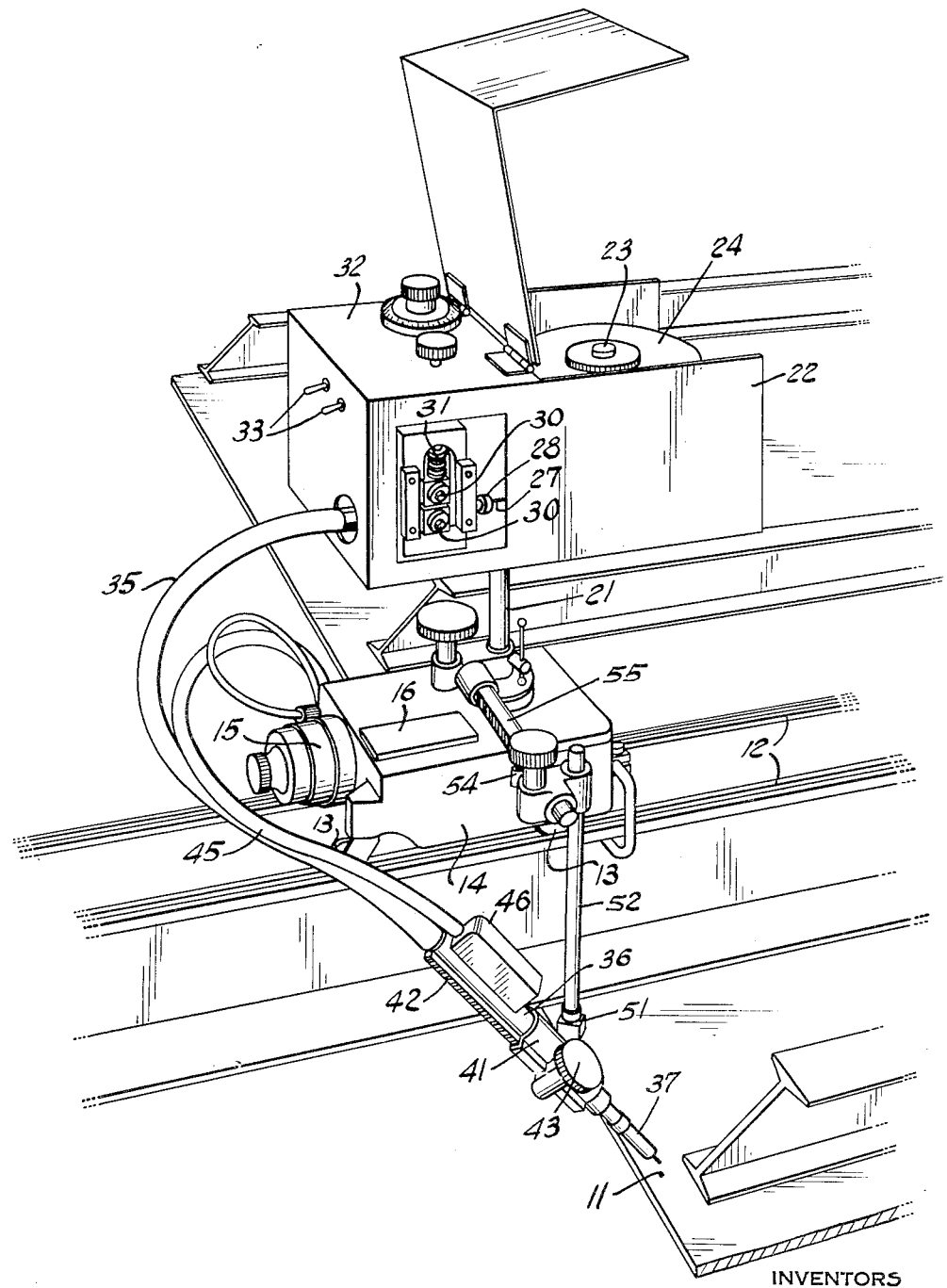
INVENTORS
JOHN J. FLOOD
CLIFTON E. THOMPSON
By G. Lipkin & Lee J. Huntzberger
ATTORNEYS

United States Patent Office 2,753,425
Patented July 3, 1956

2,753,425

WELDING MACHINE

John J. Flood, West Medway, and Clifton E. Thompson, Lawrence, Mass.

Application June 11, 1954, Serial No. 436,262

5 Claims. (Cl. 219—8)

(Granted under Title 35, U. S. Code (1952), sec. 266)

The invention described herein may be manufactured and used by or for the Government of the United States of America for governmental purposes without the payment of any royalties thereon or therefor.

The present invention concerns a welding machine and in particular concerns a fully automatic welding machine that moves along the weld as it is made.

In past practice it has been necessary to perform welding manually. Although in the past it has been proposed to use a cart that travels in the direction in which the weld is made, it has been customary for the welder carrying the welding equipment to lie upon the cart and have a helper pull the cart along as the welding progresses.

The present invention overcomes these difficulties by providing a welding machine that is fully automatic. The reel from which the welding electrode wire is fed, the drive roller assembly, the control unit, and the welding gun are all mounted upon a carriage that progresses automatically along the path of the weld.

In welding operations of this type, it is necessary under all conditions of welding that feed of the electrode to the gun be at an unvarying rate. In the event that there is a slowdown in feed of the electrode to the gun, there will result a burnback. To insure unvarying feed of the electrode to the gun, it is necessary that the reel from which the electrode is fed be so positioned that gravity does not affect the rotation of the reel in the event that the reel is unbalanced.

The present invention satisfies these requirements by providing a welding machine that insures unvarying feed of the electrode to the gun.

An object of the invention is to provide a welding machine.

Another object is to provide an automatic welding machine that progresses automatically along the path of the weld.

Another object is to provide a welding machine in which the welding gun can be adjusted both toward and away from the weld and be adjusted at any angle with respect to the weld surface.

Another object is to provide a welding machine that insures unvarying feed of the electrode to the gun.

Another object is to provide a welding machine so arranged that gravity does not affect rotation of the welding electrode reel in the event the reel is unbalanced.

Other objects and many of the attendant advantages of this invention will be readily appreciated as the same becomes better understood by reference to the following detailed description when considered in connection with the accompanying drawing wherein:

The single figure is a perspective view showing a preferred embodiment of the invention.

As shown in the drawing, there is a workpiece 11 which is to be welded. Located adjacent the path of weld is a pair of parallel rails 12, 12 upon which is mounted by wheels 13 a carriage 14 adapted to move along rails 12, 12. Wheels 13 are power driven in a conventional manner by a carriage drive motor 15 controlled by a switch 16.

Extending upwardly from carriage 14 is a column 21 at the top of which is mounted a frame 22. Mounted vertically on frame 22 is a hub 23 upon which is mounted for rotation a reel 24. Wire 27 from reel 24 is fed from reel 24 through feed-bushing 28 and between a pair of horizontal drive rollers 30. Drive rollers 30, are power driven in conventional manner by a suitable motor (not shown) and the top drive roller 30 can be suitably adjusted for tension in a conventional manner by a spring 31.

There is shown a control box 32 upon which are mounted two switches 33, 33, and within which is located a control assembly of conventional nature for controlling drive rollers 30, and flow of inert gas and electric welding current. Connected to frame 22 is a flexible casing 35 that is adapted to guide welding electrode wire 27 from drive rollers 30 to welding barrel 36 that terminates in nozzle 37. Flexible casing 35 also conducts inert gas such as helium from a suitable source to barrel 36 and nozzle 37. Barrel 36 is mounted for reciprocating movement in a sleeve 41 and the outside of barrel 36 is provided with a rack 42 adapted for cooperation with a pinion 43 to cause reciprocation of barrel 36. Welding cable 45 is connected with a unit 46 mounted on the outside of barrel 36.

Sleeve 41 that supports welding barrel 36 and nozzle 37 is connected by a universal coupling 51 with one end of strut 52 the other end of which is connected to a universal coupling 54 mounted on cross-arm 55 that is adjustably secured to carriage 14. By adjusting strut 52 upwardly or downwardly, barrel 36 and nozzle 37 can be moved toward and away from the weld. By means of universal couplings 51 and 54 the angle of barrel 36 and nozzle 37 can be adjusted with respect to the welding surface.

As seen in the drawing reel 24 is mounted with its axis in a vertical position and feed-rollers 30 are mounted with their axes horizontal. Vertical positioning of the axis of reel 24 with feed rollers 30 horizontal insures proper operation of the welding machine and unvarying feed of wire 27 through drive rollers 30. It has been found with previous machines providing a large reel mounted on a horizontal hub, that operation of the welding machine is unsatisfactory because if the reel is unbalanced so that center of gravity does not coincide with the axis of the reel, there is an uneven rotation of the reel and a "loping" rotation. The present invention provides such disposition of reel 24 and feed rollers 30, that even though reel 24 be unbalanced, there will be a smooth and unvarying rotation of reel 24; gravity will not influence the rotation even though the reel be unbalanced.

If the reel 24 be disposed with its axis horizontal, the uneven rotation of reel 24 is reflected in the operation of feed rollers 30. For example, if reel 24 be extra heavy on one side of its axis, and the axis be horizontally disposed, then when this extra heavy part of reel 24 must be rotated upwardly there is an extra strain on feed rollers 30, which momentarily slow down and cause slow down of the feed of wire 27 through nozzle 37. This results in burnback and renders a welding machine inoperative.

In operation rails 12 and the welding line of workpiece 11 are brought into parallel relation and carriage 14 is mounted upon rails 12. Sleeve 41 carrying barrel 36 and nozzle 37 is then moved toward the welding line into proper spaced relationship therefrom during which time strut 52 is extended as necessary. Strut 52 is then locked into position and universal couplings 51 and 54 are adjusted until barrel 36 and nozzle 37 occupy the proper angular position with respect to the welding surface.

A first switch 33 is then closed to energize the welding circuit and to open the gas solenoid valve (not shown) allowing inert gas such as helium to flow through flexible coupling 35. Next switch 16 is closed to energize carriage drive motor 15 and cause carriage 14 to roll along rails 12. Then a second switch 33 is closed to energize the motor (not shown) that turns drive rollers 30, and this also automatically strikes the arc. The welding unit then proceeds unattended along rails 12 at whatever speed has been predetermined and automatically forms a continuous weld.

Obviously many modifications and variations of the present invention are possible in the light of the above teachings. It is therefore to be understood that within the scope of the appended claims the invention may be practiced otherwise than as specifically described.

We claim:

1. A welding machine comprising a carriage adapted to move along the path of weld, a frame mounted on said carriage including a hub for accommodating a reel of wire, drive rollers for feeding said wire toward the weld and a control unit; a welding head including a welding barrel and nozzle; means for positioning said nozzle with respect to said carriage and the weld and including a sleeve for holding said barrel and said nozzle, a universal coupling on said sleeve, a strut connected at one end to said universal coupling, a universal coupling on said carriage, the other end of said strut being fastened to said universal coupling on said carriage; a flexible casing connecting said frame and said nozzle for guiding wire from said drive rollers to said nozzle; and electrical means for controlling the welding current, for controlling energization of said drive rollers and for controlling flow of inert gas through said flexible casing.

2. A welding machine comprising carriage means adapted to propel itself for rectilinear translation to move parallel to a path of weld; a reel of wire; second means secured to said carriage means for rotatably supporting said reel of wire about a vertical axis; third means supported by said carriage means for feeding wire from said reel toward the weld; a welding barrel and nozzle secured to said carriage means; fourth means supported between said third means and said welding barrel for guiding wire from said third means to said nozzle; and welding current means electrically connected to said wire.

3. A welding machine as defined in claim 2 further comprising universally adjustable coupling means securing said welding barrel and nozzle to said carriage means and wherein said fourth means is a flexible casing.

4. The welding machine as defined in claim 1 in which said carriage coupling is provided with an adjustable clamp that can be opened to permit sliding of said strut and closed to lock said strut in selected position, said carriage coupling being mounted on a cross-arm.

5. The welding machine defined in claim 1 in which said barrel is externally provided with a rack and said sleeve is provided with a pinion for engagement with said rack to move said barrel and said nozzle inwardly and outwardly of said sleeve.

References Cited in the file of this patent

UNITED STATES PATENTS

| | | |
|---|---|---|
| 2,314,917 | Baird | Mar. 30, 1943 |
| 2,544,801 | Muller et al. | Mar. 13, 1951 |

FOREIGN PATENTS

| | | |
|---|---|---|
| 445,583 | Germany | June 20, 1927 |